Feb. 24, 1970  F. B. VAZQUEZ  3,496,616
GRIPPING AND LOCKING DEVICE
Filed Aug. 15, 1968
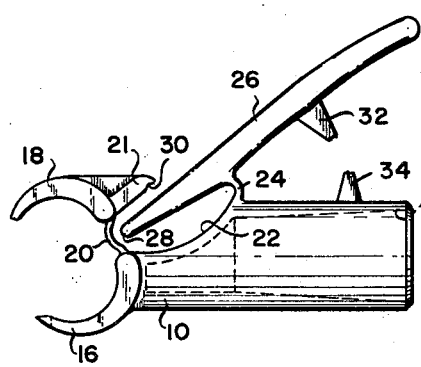
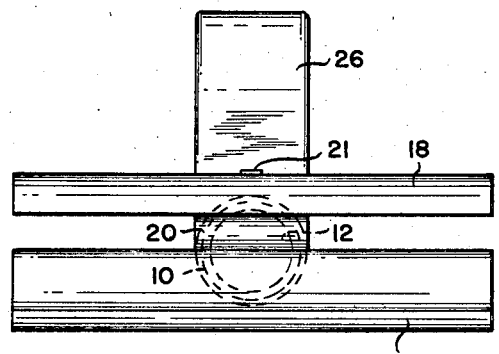
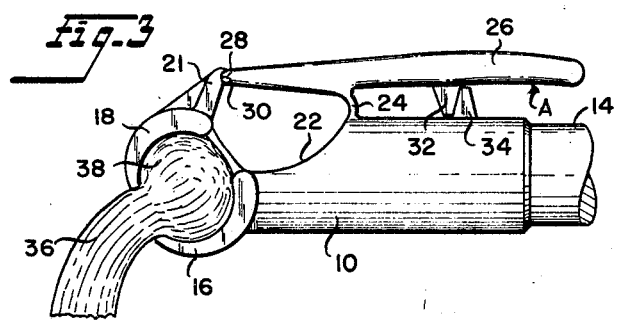
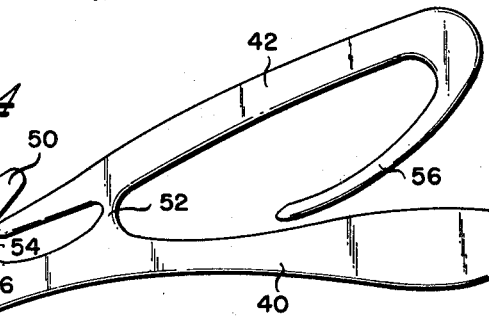
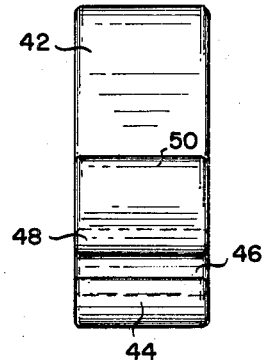
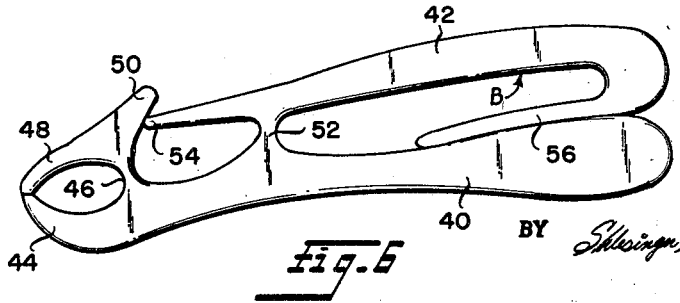
INVENTOR
Frank B. Vazquez
BY Shlesinger, Arkwright & Garvey
ATTORNEYS United States Patent Office 3,496,616
Patented Feb. 24, 1970

3,496,616
GRIPPING AND LOCKING DEVICE
Frank B. Vazquez, 7815 Lewinsville Road,
McLean, Va. 22101
Filed Aug. 15, 1968, Ser. No. 752,890
Int. Cl. B25g 3/00; B25b 5/04
U.S. Cl. 24—258          14 Claims

ABSTRACT OF THE DISCLOSURE

A gripping and locking device including a stationary, elongated base member having a first gripping member fixedly secured to one terminal thereof, a second gripping member connected by a resilient web member to the stationary base member, the second gripping member lying in opposed, space relationship to the first gripping member, a locking lever joined at a point intermediate its length by a resilient web to the stationary base member, a terminal of the locking lever being in contiguous relation with the rear of the second gripping member, the second gripping member being rotated about its web connection with the base member to move a portion thereof in closer proximity to the stationary first gripping member, the second gripping member being further provided with means engaged by a terminal of the locking lever for locking the second gripping member in proximate relation to the first gripping member.

It is an object of this invention to provide a gripping and locking device of simple, economical construction embodying opposed gripping members and a locking member for urging one of the gripping members in the direction of the opposite gripping member, to firmly hold an object placed between the gripping members.

Another object is to provide a gripping and locking device of the character described wherein the locking member positively retains the gripping members in holding engagement with the object placed therebetween, thereby preventing accidental opening of the gripping members.

A further object is to provide a gripping and locking device of unitary construction which is readily adaptable for use as a holder for household products, a clamp, or a tool.

A still further object is to provide a gripping and locking device of the character described, wherein one of the gripping members is fixedly secured to a stationary base member, the second gripping member and the locking member being connected by resilient webs to the base member, with a terminal of the locking member frictionally engaging the rear face of the second gripping member to lock the two gripping members together.

Other objects will be manifest from a consideration of the following description of the presently preferred forms of the present invention taken in connection with the appended drawing.

DESCRIPTION OF FIGURES OF DRAWING

FIGURE 1 is a side elevational view of the gripping and locking device of the present invention incorporated in a holder for household products, and showing the latter in open position;

FIGURE 2 is a front elevational view of the same;

FIGURE 3 is a view similar to FIGURE 1, showing the holder in closed position and illustrating its use as a mop holder;

FIGURE 4 is a side elevational view of the gripping and locking device of the present invention as applied to clamp type pliers;

FIGURE 5 is a front elevational view of the form of invention illustrated in FIGURE 4;

FIGURE 6 is a view similar to FIGURE 4 showing the clamp type pliers in closed position.

DESCRIPTION OF FIGURES 1 TO 3

In FIGURES 1 to 3, there is illustrated the gripping and locking device of the present invention adapted for use as a holder for household products such as mops, brushes, sponges, squeegees, etc. For this purpose, the holder is preferably of unitary construction and may be molded of polypropylene, high impact styrene, or any other suitable material.

The device of FIGURES 1 to 3 generally comprises an elongated cylindrical base member 10 one terminal of which is hollowed out to form a recess 12 adapted to receive the handle 14 of a mop or the like. The opposite terminal of base member 10 is provided with a stationary gripping jaw 16 of any desired length which is arcuate in cross section and extends from the lower portion of base member 10. A second gripping jaw 18 also of arcuate cross section is in facing relationship to gripping jaw 16 is joined to base member 10 at a point adjacent jaw 16 by a resilient web 20. Web 20 forms a hinge for permitting movement of gripping jaw 18 about resilient web 20 as a pivot point to close the jaws on an object placed therebetween. The aft rear portion of gripping jaw 18 is provided with a central extension 21 which is angular with respect to base member 10.

That portion of the terminal of base member 10 adjacent web 20 is arcuately sloped to form a concave surface 22, the upper extremity of which terminal is extended to provide a second resilient web 24 which is joined to a locking lever 20, at a point intermediate its length, web 24 serving as a hinge to permit movement of locking lever 26 relative to base member 10.

One terminal of locking lever 26 is formed to provide a locking tip 28 which frictionally engages the aft face of jaw extension 21. Upon movement of the aft end of locking lever 26 in the direction of base member 10, gripping jaw 18 is rotated about web 20 by the pressure exerted on extension 21 by locking tip 28. In order to ensure a positive locking action, a complemental locking notch 30 is strategically located for engagement by locking tip 28 in the manner illustrated in FIGURE 3. If desired, several locking notches may be employed.

At points intermediate base member 10 and locking lever 26, there are provided stop means embodying protuberances 32 and 34, protuberance 32 being formed integrally with the underface of locking lever 26, and protuberance 34 being formed integrally with the upper face of base member 10. By these means, movement of locking lever 26 in the direction of base member 10 is limited, thereby preventing undue stress on web 24 and movement of locking tip 28 beyond notch 30.

In the open position, gripping jaws 16 and 18 are sufficiently far apart that a mop head or the like may be readily inserted therebetween. The mop head may include strand portions 36 which are joined to a cylindrical base member 38, the latter being clamped by complemental faces of gripping jaws 16 and 18 when the gripping and locking device is closed.

OPERATION

In use, the mop head or the like is placed between open gripping jaws 16 and 18, following which the aft terminal of locking lever 26 is moved in the direction of base member 10, thereby rotating the lever about resilient web 24 as a pivot point. This in turn causes locking tip 28 to engage and force gripping jaw 18 to rotate about resilient web 20 as a pivot point until locking tip 28 engages locking notch 30. At this time, the device is in the position shown in FIGURE 3 and the mop head firmly secured in place in the holder. A handle 14 may be then inserted into hollowed out recess 12 of base member 10 and the mop is ready for use.

In order to remove the mop head from the locking and gripping device, it is only necessary that upward pressure be exerted on locking lever 26 at point A, which causes locking tip 28 to move out of notch 30 and downwardly along the aft face of jaw extension 21 under the tension of resilient web 20. The assembly is then in the position shown in FIGURE 1 and the mop head may be readily removed therefrom.

DESCRIPTION OF FIGURES 4 TO 6

In FIGURES 4 to 6 there is illustrated the gripping and locking device of the present invention adapted for use as clamp type pliers. In this form of the invention, the pliers may be of one piece molded construction made of the same plastic materials as described above in connection with FIGURES 1 to 3.

In this form of the invention, there are provided a pair of arms or handles 40 at 42. At one of its terminals, handle 40 is formed to provide an arcuate gripping jaw 44. Adjacent jaw 44, there is provided a resilient web 46 forming a hinge which web is connected to a second arcuate gripping jaw 48 which lies in opposed relationship to gripping jaw 44. The aft rear edge of gripping jaw 48 is provided with a central angular extension 50.

At a point intermediate the length of handle 40, there is provided a second resilient web 52 forming a hinge which is engaged with an intermediate portion of handle 42. One terminal of handle 42 is provided with a locking tip 54 and the opposite terminal is extended and reversely bent back upon itself to form a spring-like stop member 56 for limiting the movement of handle 42 in the direction of handle 40.

The operation of the clamp type pliers illustrated in FIGURES 4 to 6 is similar to that described in connection with the form of the invention illustrated in FIGURES 1 to 3. As indicated in FIGURE 6, once handle 42 is moved in the direction of handle 40, locking tip 54 moves upwardly against angular extension 50 of gripping jaw 48 to pivot the latter about resilient web 46 and bring the forward faces of jaws 44 and 48 into gripping engagement with an object placed therebetween. In this form of the invention, it is preferable that the jaws be held in gripping engagement with the object by hand pressure, forcing handle 42 towards handle 40 against the tension of spring-like stop member 56. Upon release of pressure on the handles, jaws 44 and 48 are opened under tension of spring-like stop member 56.

If desired, angular extension 50 and locking tip 54 may be so constructed that, upon exertion of downward pressure on handle 42 extension 50 and tip 54 frictionally engage each other in a manner to retain the clamp type pliers in locked position. Release of the jaws is initiated by a slight upward pressure on handle 42 at point B, and spring-like stop member 56 exerts tension on handle 40 to move the jaws to fully open position.

With the gripping and locking device of the present invention, simple and economical means are provided for making a holder for household products such as mops, brushes, sponges, squeegees, etc., or clamp type pliers. Also, with the gripping and locking device of the present invention, objects may be readily secured between the gripping jaws without danger of accidental opening thereof. However, an object may be readily removed from between the jaws by application of slight pressure at a specified point of the device.

While there has been herein shown and described the presently preferred forms of the present invention, it is to be understood that such has been done for purposes of illustration only.

What I claim is:
1. A gripping and locking device comprising:
 (a) an elongated base member,
 (b) a first gripping member fixed to a terminal of said base member,
 (c) a resilient connecting member extending from the base member terminal adjacent said first gripping member,
 (d) a second gripping member secured to said resilient connecting member in opposed relationship to said first gripping member,
 (e) a locking member, and
 (f) a second resilient connecting member connecting an intermediate part of said base member to an intermediate part of said locking member,
 (g) a terminal of said locking member engaging the rear face of said second gripping member,
 (h) said locking member being movable about said second resilient connecting member for movement along the rear face to said second gripping member,
 (i) said second gripping member moving about said first resilient connecting member as a pivot point, in the direction of said first gripping member, for holding an object placed between the gripping members.

2. The gripping and locking device of claim 1 wherein:
 (a) a terminal of the locking member is in frictional engagement with the rear face of said second gripping member to lock the gripping members in closed position.

3. The gripping and locking device of claim 1, with the addition of:
 (a) a locking notch in the rear face of said second gripping member,
 (b) said locking notch being adapted to receive a terminal of said locking member, to lock said gripping members in closed position.

4. The gripping and locking device of claim 1, wherein:
 (a) the opposed faces of said gripping members are arcuate in cross section.

5. The gripping and locking device of claim 1, wherein:
 (a) the terminal of said base member remote from said gripping members is hollowed out to provide a recess into which a handle may be inserted.

6. The gripping and locking device of claim 1, with the addition of:
 (a) stop means for limiting the movement of said locking member towards said base member.

7. The gripping and locking device of claim 6, wherein said stop means includes:
 (a) protuberances extending from said locking lever and said base member to limit movement of the former towards the latter.

8. The gripping and locking device of claim 6, wherein said stop means includes:
 (a) a curvilinear spring-like member extending from said locking lever in the direction of said base member.

9. A gripping and locking device comprising:
 (a) an elongated base member,
 (b) one terminal of said base member being hollowed out to form a handle-receiving recess,
 (c) a first gripping jaw secured to the opposite terminal of said base member,
 (d) a resilient web extending from said opposite terminal of said base member adjacent said first gripping jaw,
 (e) a second gripping jaw secured to the free terminal of said resilient web,
 (f) said gripping jaws being in facing relationship to each other, and
 (g) a locking lever,
 (h) a second resilient web connecting an intermediate part of said locking lever to an intermediate part of said base member,
 (i) a terminal of said locking lever engaging the rear face of said second gripping jaw,
 (j) said second gripping jaw being pivoted on said first resilient web toward said first gripping jaw upon movement of said locking lever along the rear face of said second gripping jaw.

10. The gripping and locking device of claim 9, wherein:
   (a) said webs are resilient throughout their lengths.

11. The gripping and locking device of claim 9 with the addition of:
   (a) a locking notch in the rear face of said second gripping member,
   (b) said locking notch being adapted to receive a terminal of said locking member, to lock said gripping members in closed position.

12. The gripping and locking device of claim 9 with the addition of:
   (a) stop means for limiting the movement of said locking member towards said base member.

13. The gripping and locking device of claim 12, wherein said stop means includes:
   (a) protuberances extending from said locking lever and said base member to limit movement of the former towards the latter.

14. The gripping and locking device of claim 12, wherein said stop means includes:
   (a) a curvilinear spring-like member extending from said locking lever in the direction of said base member.

References Cited

UNITED STATES PATENTS

| | | | |
|---|---|---|---|
| 1,902,710 | 3/1933 | Kondo | 81—5.1 |
| 2,328,287 | 8/1943 | Martin | 15—150 |
| 2,461,272 | 2/1949 | Hanson | 81—427 |
| 3,209,966 | 10/1965 | Wach. | |

FOREIGN PATENTS

| | | |
|---|---|---|
| 1,212,165 | 10/1959 | France. |
| 57,904 | 3/1923 | Sweden. |

DONALD A. GRIFFIN, Primary Examiner

U.S. Cl. X.R.

15—150; 81—5.1